Oct. 22, 1935. B. A. SWENNES ET AL 2,018,101
AUTOMATIC CLUTCH
Filed Jan. 23, 1933 5 Sheets-Sheet 5
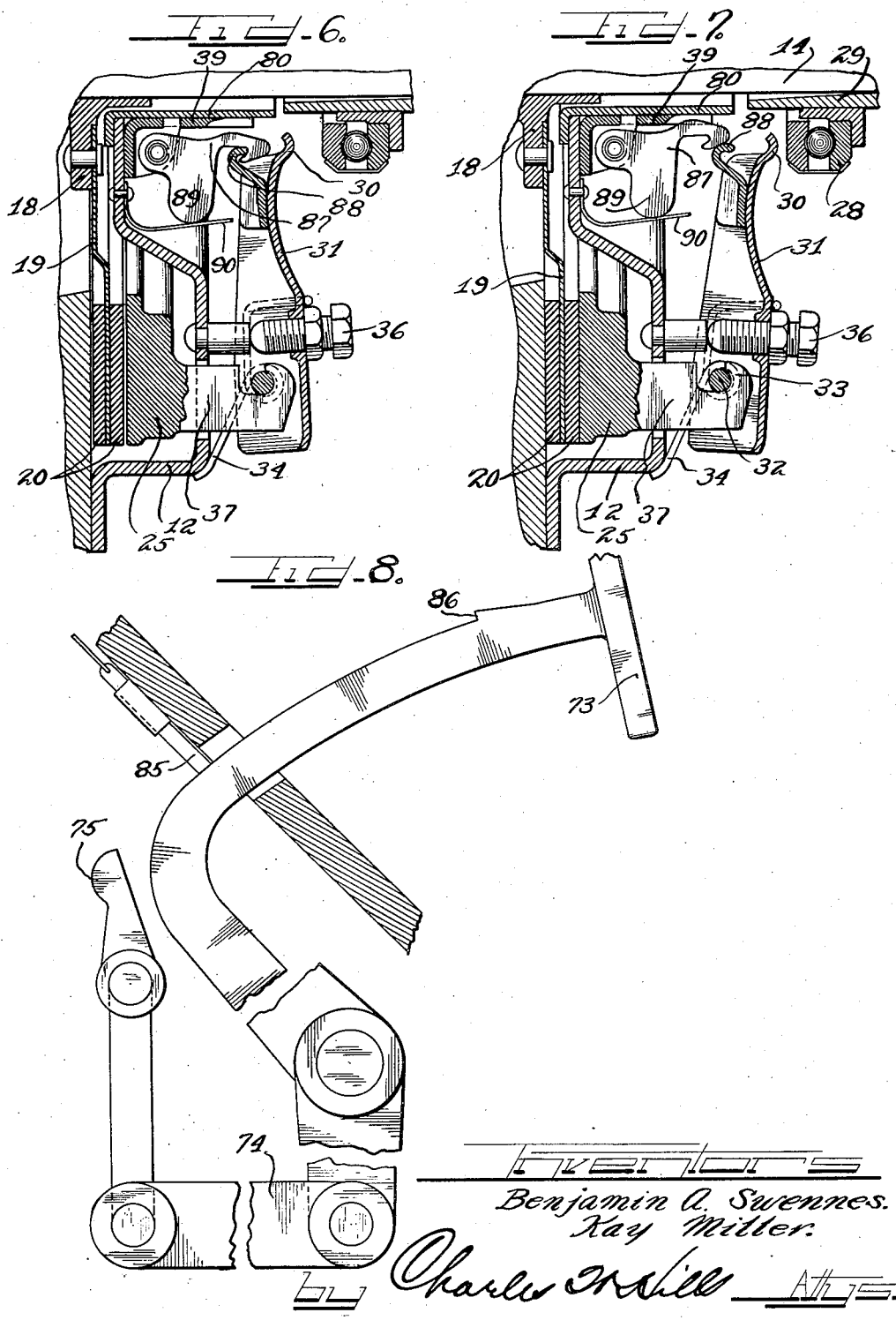
Inventors
Benjamin A. Swennes.
Kay Miller.

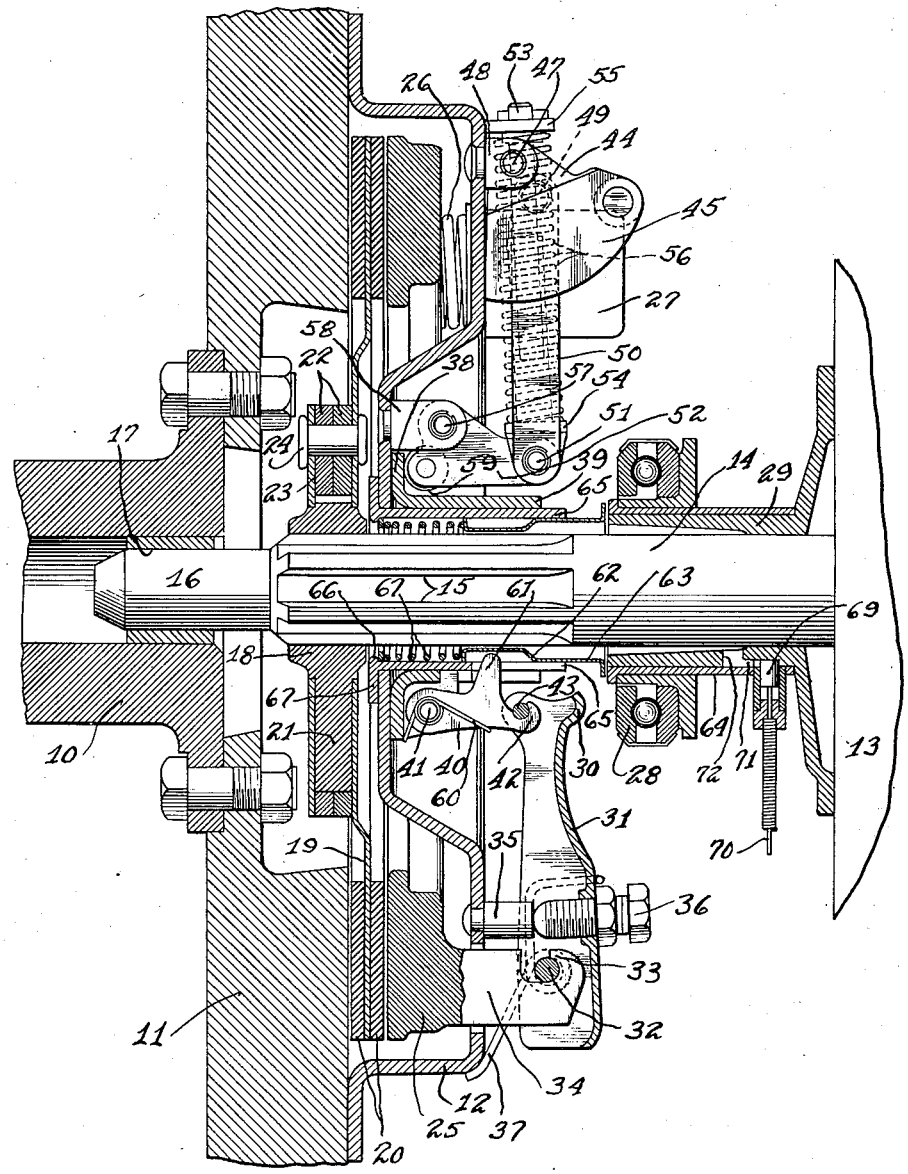

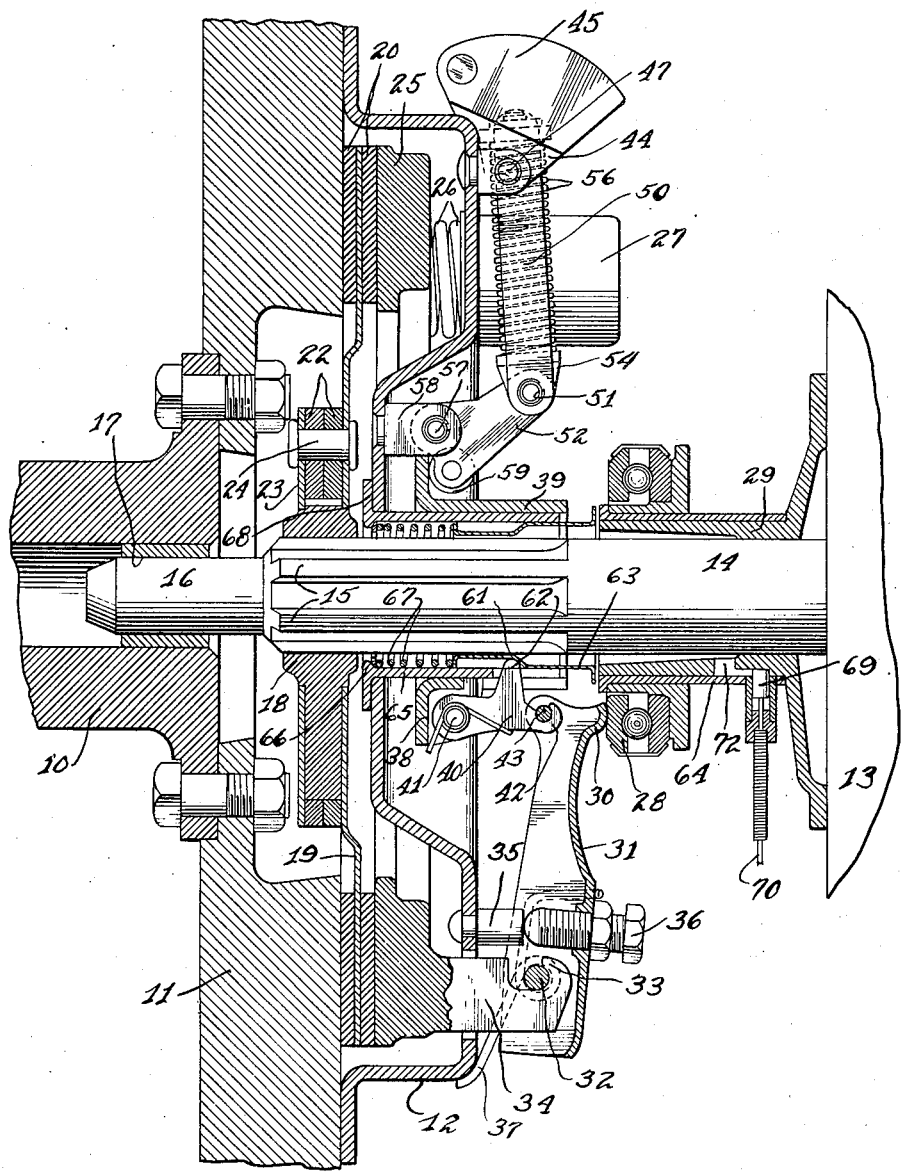

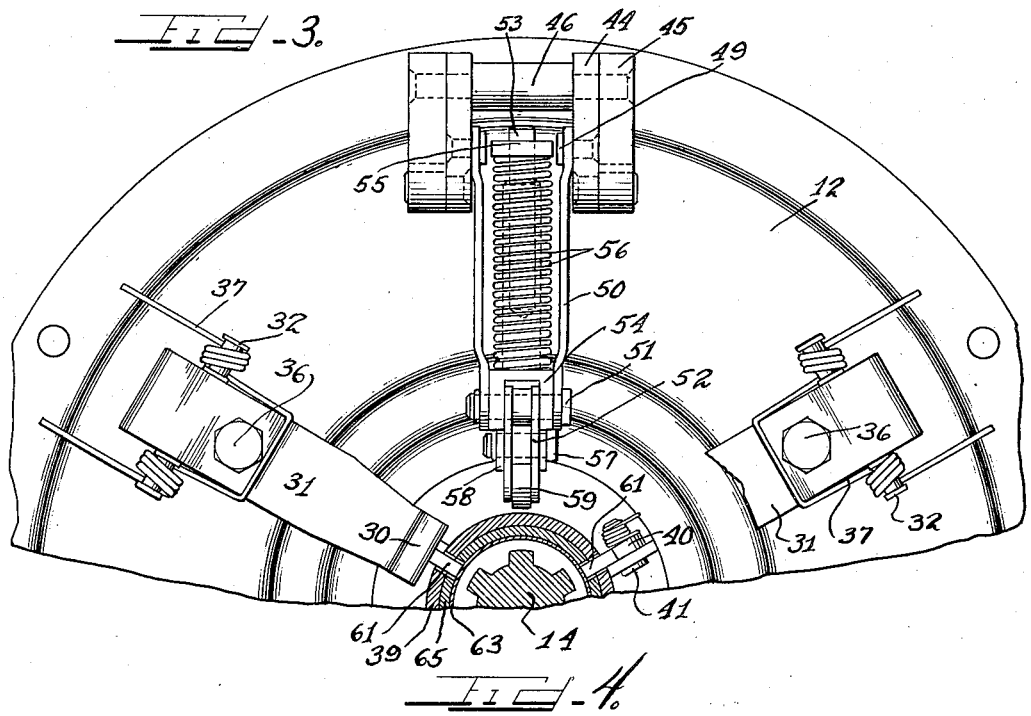
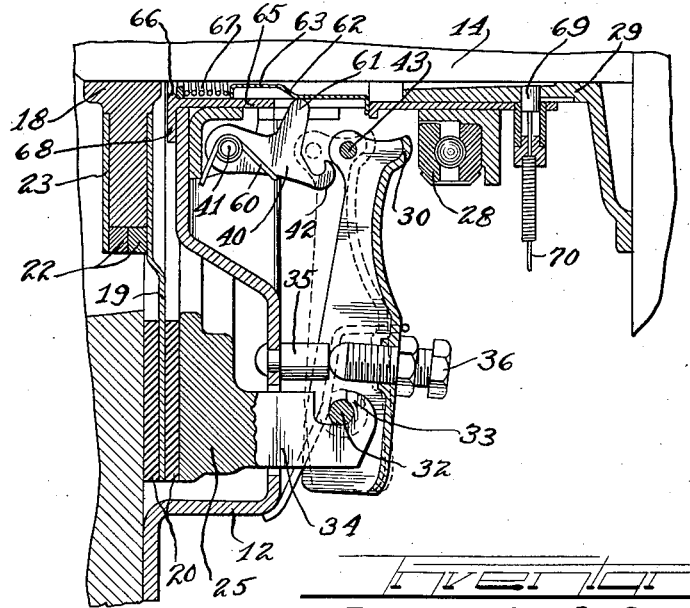

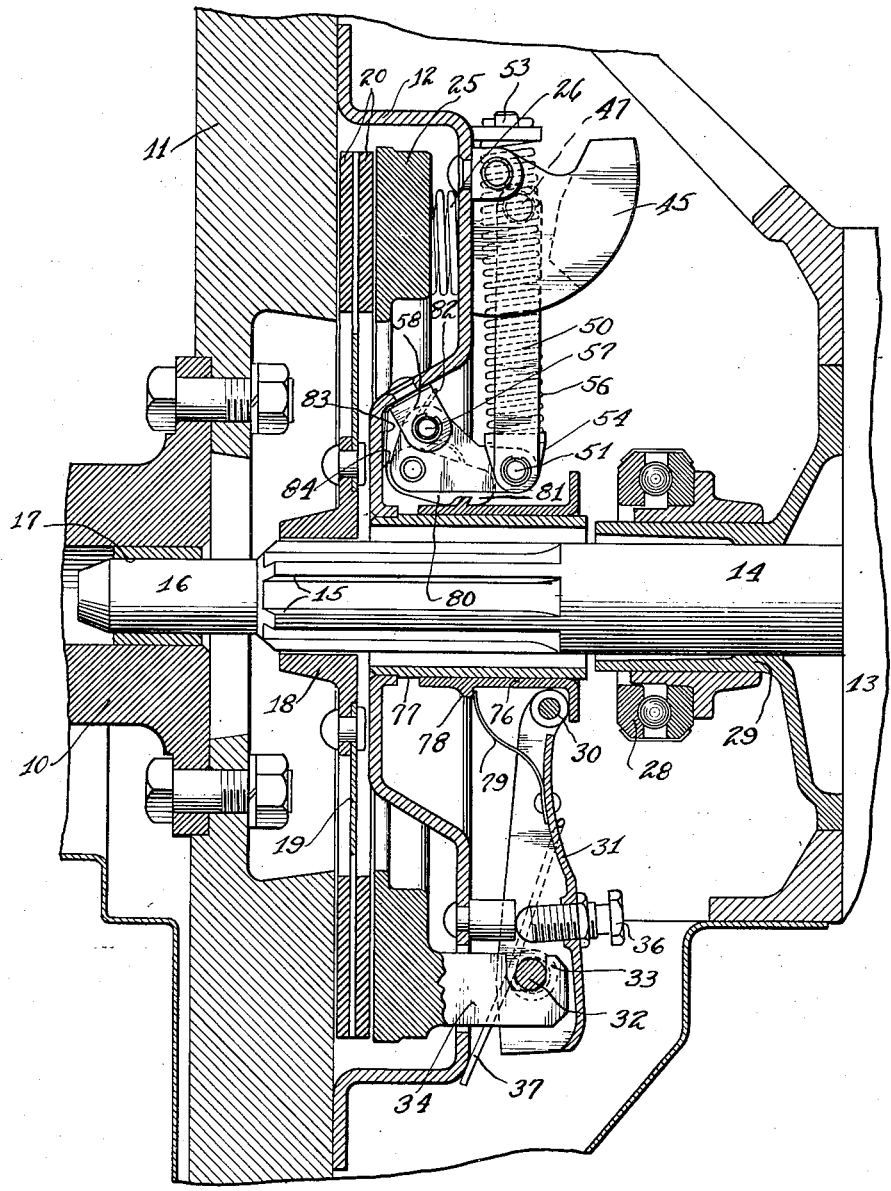

Patented Oct. 22, 1935

2,018,101

UNITED STATES PATENT OFFICE 2,018,101

AUTOMATIC CLUTCH

Benjamin A. Swennes and Kay Miller, Rockford, Ill.; said Swennes assignor to Borg-Warner Corporation, Chicago, Ill., a corporation of Illinois Application January 23, 1933, Serial No. 653,026

11 Claims. (Cl. 192—105)

This invention relates to the application of an automatic speed responsive control to friction clutches of an otherwise conventional manner of operation wherein the clutch is in spring loaded engagement at all times except when the operator manually disengages the clutch.

It is an important object of this invention to provide an improved automatic speed responsive control for application to the clutch structure whereby the automatic control serves to hold the clutch out of engagement below a predetermined rotative speed, and is rendered inoperative above such rotative speed, leaving the clutch under manual control. An advantage of this arrangement is that the clutch can be manually disengaged at any time regardless of the position of the automatic control, and such operation requiring no more force than in a conventional clutch. Thus the automatic control affects clutch operation only below a predetermined speed and the control can be locked out at will to permit clutch engagement below such speed as when it is desired to start the engine by pushing the vehicle, or to leave the transmissioin in gear to utilize the engine as a parking or compression brake.

It is a further object of this invention to provide an improved lock-up mechanism for automatically controlled clutches of the type described, wherein the automatic control can be disconnected to change the clutch into a conventionally operable manually controlled clutch engaged at all times except when manually disengaged by means of the usual pedal control.

It is a further object of this invention to provide an improved and simplified clutch structure wherein the clutch can be operated as a normally engaged clutch either manually or automatically disengageable below a predetermined rotative speed, at the will of the operator.

Other and further important objects of this invention will be apparent from the disclosures in the specification and the accompanying drawings.

This invention (in a preferred form) is illustrated in the drawings and hereinafter more fully described.

On the drawings:

Figure 1 is a vertical longitudinal section, with parts in elevation in its disengaged position, of a clutch embodying the preferred form of this invention.

Figure 2 is a section similar to Fig. 1 showing the clutch in its automatically engaged position.

Figure 3 is a fragmentary rear elevation of the clutch.

Figure 4 is a fragmentary section showing the automatic control manually disengaged to allow clutch engagement below the speed required for automatic engagement.

Figure 5 is a section similar to Figure 1 showing another form of clutch embodying the features of this invention.

Figure 6 is a fragmentary section showing the automatically disengaged position of a third form of this invention.

Figure 7 is a section similar to Figure 6 showing the clutch engaged with the automatic control disengaged therefrom.

Figure 8 is a view of a clutch operating pedal and linkage arranged with a lockout or release for disconnecting the automatic control of the form shown in Figs. 6 and 7.

As shown:

The clutch chosen to illustrate an embodiment of this invention is of a type intended for automotive installations where it is used to disconnect the transmission from the engine to permit gear shifting in the transmission and to allow the engine to idle while the vehicle is standing still. The rear end of an engine crankshaft is indicated by the numeral 10 in Figures 1 and 2 and carries a flywheel 11 against the rear face of which is bolted a clutch housing 12. A transmission case 13 has a forwardly extending shaft 14 which passes through a central aperture in the housing and is provided with splines 15, the front end 16 of the shaft having a pilot bearing 17 in the engine crankshaft 10.

The hub 18 of a clutch disc 19 is slidably mounted on the splines 15 of the shaft 14, the disc 19 and shaft 14 being the driven members of the clutch. The clutch disc 19 carries the usual friction facing material 20 on both sides, and may have a resilient mounting on its hub to soften engagement shocks, as well as prevent the transmission of torsional vibrations to the transmission gear train. The particular mounting shown in Figs. 1 and 2 may be termed a torque cushion since the hub has a series of projections 21 engaged by complementarily shaped rubber discs 22 held between a plate 23 and the clutch disc 19 by rivets 24.

The clutch disc 19 with its facings 20 is positioned between the rear face of the flywheel and a pressure plate 25 within the housing 12, the clutch disc serving to drive the shaft 14 when the pressure plate is advanced to clamp the clutch disc against the flywheel. As is usual practice in conventional manually operated clutches, the pressure plate is spring loaded by a plurality of pressure springs 26, located in pockets 27 formed in the housing 12 and bearing against the pressure plate with a predetermined load to provide the total pressure on the pressure plate required by the desired torque rating of the clutch.

Disregarding for the moment the automatic features of the clutch of this invention, a manual control for disengaging the clutch through the use of the usual clutch pedal mechanism such as is shown in Fig. 8 is provided. This comprises a throwout bearing 28 slidably mounted on a sleeve 64 also slidable on a shell 29 enveloping the driven shaft 15, the shell being rigidly mounted on the transmission case 13. The throwout bearing 28 is adapted to be shifted to the left, in the figures, by a pedal 73 acting through linkage 74 on a fork 75 engaging the bearing to force the inner ends 30 of throwout fingers 31. The outer ends of the fingers 31 carry pins 32 engaging in hooks 33 formed in bosses 34 projecting from the pressure plate through apertures in the housing, the fingers being fulcrumed on buttons 35 on the housing by means of adjustable cap screws 36 in the fingers. The throwout fingers are retained in the bosses 34 by means of torsion springs 37 coiled on the pins 32 and having the ends thereof engaging the fingers and housing respectively, the springs tending to shift the fingers in a counterclockwise direction about their fulcrums and thus preventing rattling as well as taking up clearances at the hook. Thus a leftward shift of the throwout bearing 28 acts through the fingers 31 to pull the pressure plate away from the clutch disc against the action of the springs 26.

The foregoing description embodies the usual features of conventional single disc clutches which are manually disengaged by the operator at will. Thus it will be evident that as far as the foregoing structure is concerned this invention is intended to be applicable to known variations of the elements going to make up a conventional clutch, the subject matter of this invention relating to an automatic control that disengages the clutch automatically below a predetermined rotative speed unless the automatic control is locked out of engagement to convert the clutch to a conventional one wherein the clutch is always engaged unless deliberately held out of engagement by the operator.

The form of automatic control shown in Figs. 1 to 4 in part resembles that disclosed in the joint application of B. A. Swennes and Kay Miller, Serial No. 609,567, filed May 6, 1932, but differs therefrom in the provision made for converting the clutch into a fully conventional type, as far as the operation is concerned, in order that the clutch may be normally engaged even when the engine is not running as when it is desired to start a dead engine by cranking the same through the movement of the vehicle.

The automatic control of Figs. 1 to 4 which acts to hold the clutch disengaged below a predetermined speed of the driver and is thrown out of engagement by centrifugal action above such speeds, acts against the flange 38 of a sleeve 39 concentric with the shaft 15, the flange 38 bearing against the housing 12 in Figure 1. This sleeve carries pawls 40 pivoted thereto at 41, the pawls having hooks 42 engaging pins 43 on the inner ends of the throwout fingers 31. When so engaged and with the automatic mechanism holding the sleeve in the position of Figure 1 against the housing, the clutch is automatically disengaged since the pawls act through the fingers 31 to retract the pressure plate. When the automatic mechanism is thrown out of engagement by centrifugal force the sleeve 39 is permitted to move to the right into the position of Figure 2 in response to the pressure of the springs 26 which force the pressure plate 25 to the left into clutching engagement and act through the pressure fingers and pawls to pull the sleeve 39 to the right. When the pawl hooks are disengaged from the pins 43 by means hereinafter to be described the throwout fingers are fully under the control of the throwout bearing 28 and thus the clutch becomes a conventional manually operated one which remains fully engaged irrespective of the automatic control, the sleeve 39 remaining in its left hand position as shown in Figure 4.

The automatic control shown in the upper portions of Figures 1 and 2 comprises pairs of spaced members 44 having applied weights 45 and connecting bridges 46 to increase the effective weight and leverage of the assembly on its pivots 47 in spaced brackets 48 secured to the housing, arranged to leave a central gap therebetween. The assembled weights are so formed and pivoted as to swing outwardly in a radial plane relative to the clutch axis, under the influence of centrifugal force, into the position of Figure 2, where the weights come to rest against the housing. Each side member carries fulcrum pins 49, offset relative to the pivot 47, which pins 49 are connected by links 50 to a pin 51 at the outer end of a lever 52. A spring guide rod 53 telescopes in the shank of a yoke 54 on the pin 51 and has its outer end secured by a collar and pin on opposite sides of a lug 55 on the housing between the brackets 48, a spring 56 being interposed between the lug 55 and the yoke 54 which spring acts to oppose the outward movement or response of the weights to centrifugal forces acting thereon. It will be evident that the degree of preloading of the spring 56 will determine the rotative speed at which the weights swing outwardly, since centrifugal force varies as the square of the rotative speed.

The lever 52 is fulcrumed at 57 to a bracket 58 on the housing 12. The lever also carries an offset roller 59 bearing against the flange 38 of the sleeve 39, the arrangement being such that the combined forces of the springs 56 acting through the lever 52 and roller 59 are sufficient to overbalance the clutch pressure springs 26 acting on the sleeve 39 through the throwout fingers 31, thus holding the sleeve in the position of Figure 1 until centrifugal force swings the weights outwardly to release the pressure of the lever and rollers 59 against the flange of the sleeve.

Automatic engagement of the clutch is dependent on the overbalancing of the clutch springs 26 by the weight springs 56 by the clutch pressure springs, the springs 56 having their force multiplied by the leverage acting on the rollers 59 while the springs 26 have their force reduced by the leverage of the throwout fingers. Thus the sleeve 39 may float in a balanced position between these spring forces as long as the clutch is set for automatic operation. In practice, however, the springs 56 overbalance the opposing forces to a predetermined extent dependent upon the desired rotative speed of clutch engagement, the excess spring force acting to hold the weights in the position of Figure 1 until increasing centrifugal force absorbs the excess spring force. Since the variables are under the designer's control the clutch can be designed to operate at a predetermined speed and to have a predetermined maximum torque capacity and rate of engagement.

It will be noted from Figure 2 that with the clutch automatically and fully engaged it can still be manually disengaged by shifting the throwout bearing to the left, this action acting through the throwout fingers to retract the pressure plate and to shift the pawls 40 and sleeve 38 to the left away from the position of the lever 52, which is shifted out of the way of the sleeve, as regards the clutch engaging movement thereof, by the action of the centrifugal weights. Thus the automatic control serves to normally disengage the clutch and is thrown out of operation by centrifugal force at a predetermined speed.

Means are provided for disengaging the pawl hooks 42 from the pins 43 and holding them out of position which results in the release of the throwout fingers from the sleeve 39 and the automatic control acting thereon so that the clutch is converted into a manually controlled clutch which is always fully engaged unless the throwout bearing is shifted to the left by the usual clutch operating pedal and linkage controlling the movement of the throwout bearing. The hooks are so formed that disengagement is prevented until relieved of load, and the pawls are also backed by torsion springs 60 strong enough to resist the centrifugal force developed in the pawls. The pawls are provided with projecting lugs 61 engageable by cams 62 formed in a sleeve 63 enveloping the shaft 15, which sleeve is adapted to be forced to the left by a similar movement of the throwout bearing acting against a flange on a sleeve 64 positioned between the bearing and the shell 29, the parts being so proportioned that the throwout bearing first contacts and moves the fingers 31 sufficiently to release the hooks 42 and then the cams 62 on the sleeve 63 act on the lugs 61 to throw the pawls out of engagement with the pins 43. If the reverse movement now occurs, and the sleeve 63 follows the throwout bearing back to the position of Figure 1 the hooks will reengage the pins in the fingers 31. On the other hand, if the sleeve 63 remains stationary while the bearing returns to its normal position, the hooks will be held away from the pins as in Fig. 4, the fingers will then follow the bearing and the automatic control will be disconnected from the clutch, which will then be solely under the control of the throwout bearing. The sleeve 63 is normally caused to follow the throwout bearing by providing a second sleeve 65 enveloping the first and having an inturned flange 66 on its left end forming a spring seat for a spring 67 acting on the end of the sleeve 63. The second sleeve also has an outturned flange 68 which is secured to the housing to hold the sleeve stationary.

A lockout for the automatic control is provided comprising means for holding the sleeve 64 extended in its leftward position as shown in Fig. 4, thus holding the cam sleeve 63 in a position to prevent re-engagement of the pawl hooks 42 with the throwout finger pins 43. This means comprises a plunger 69 under control of a Bowden wire 70 which plunger is mounted on the sleeve 64 and slides in a slot 71 in the shell 29. At its left end the slot 71 is deepened to form a hole at 72 so that if the sleeve 64 is positioned over the hole 72 and the plunger 69 advanced thereinto the sleeve 64 will be locked in its advanced position without interfering with the manual movements of the throwout bearing. The Bowden wire control 70 for the plunger is preferably interconnected with a free wheeling lockout control if such is used on the vehicle, although the control can be direct, as by a push or pull button on the dash if desired. Since the exact arrangement of the operating end of the Bowden wire is immaterial to the invention, it has not been shown on the drawings.

In the form of the invention shown in Fig. 5, a sleeve 76, similar in function to the sleeve 39 of the previous form, is reversed so that its flange engages the ends 30 of the throwout fingers 31, the sleeve 76 sliding on a tube 77 carried by the housing 12. The sleeve 76 is formed with an outstanding peripheral hook-like ridge 78 intermediate its length and springs 79, carried by the throwout fingers 31, have their ends bearing against the ridge 78 to cause the sleeve to maintain its position relative to the throwout fingers. The lever 52 of the previously described automatic control carries a member 80 pivoted thereto in place of the previously described roller 59, the member having a hook 81 which engages the ridge 78 on the sleeve when the automatic control is functioning. The hook 81 is normally held in the position shown by a spring 82 coiled on the pin 57 and engaged between the member 80 and the bracket 58, which spring resists centrifugal force acting on the unbalanced member. With the foregoing arrangement a movement of the throwout bearing 28 to the left when the automatic control is in the position shown in Figure 5, will force the sleeve 76 to the left so that the ridge 78 on the sleeve will force the hook 80 upwardly to a position where a spring detent 83 will engage a shoulder 84 on the member 80 and hold the hook out of engagement with the ridge 78 during the return movement of the sleeve 76 to the right upon release of the pedal pressure. The automatic control is then released or disengaged from the clutch throwout mechanism until such time as the engine speeds up sufficiently to swing the automatic control outwardly, shifting the lever 52 counterclockwise and pulling the shoulder 84 away from the detent spring 83.

The operation of the manual control may conveniently be arranged as shown in Fig. 8 where a remotely controlled latch 85 normally limits the movement of the pedal 73 by engaging a stop 86 thereon, withdrawing the latch 85 allowing further movement of the pedal sufficient to shift the sleeve 76 to the left from the position shown in Fig. 5 to release the hook 81. Thereupon a release of the clutch pedal allows the sleeve to move to the right until clutch engagement occurs. The latch serves to prevent inadvertent release of the automatic control as it is so positioned as to limit the movement of the pedal to an amount sufficient to move the throwout bearing to the left up to the sleeve which is shown in the clutch disengaged position. In other words the pedal movement up to the latch is sufficient to release the automatically engaged clutch but an overshift is required to disengage the automatic control from the clutch and upon speeding up the engine the automatic control is automatically reengaged with the sleeve.

The third form of clutch operating mechanism shown in Figs. 6 and 7 differs from that shown in Fig. 1 only in the form of the pawls 87 and their engagement with hooks 88 carried by the throwout fingers 31, the pawls in this case being designed to be influenced by centrifugal force, added mass 89 being provided and partially opposed by springs 90. With this arrangement, disengagement of the automatic control, by unlocking the sleeve 39 from the throwout fingers 31, can be accomplished only when the engine speed is low enough to allow the springs 90 to overcome the centrifugal force acting on the pawls 87. In practice the springs and pawls are so proportioned as to permit such an operation when the engine is idling or dead, under which conditions the automatic control would hold the clutch disengaged. Thus the automatic control can then be disengaged by advancing the throwout bearing 28 to the left, pushing the throwout fingers beyond the position shown in Fig. 6 until the pawl 87 disengages from the hook 88 whereupon a return of the throwout bearing to the right allows the clutch to engage as shown in Fig. 7. The pedal control for the throwout bearing may conveniently be arranged as shown in Fig. 8 where the latch 85 cooperates with the detent 86 to allow the manual control to disengage the clutch without releasing the automatic control, while upon a retraction of the latch, a further pedal movement allows disengagement of the automatic control. Re-engagement of the automatic control can be had by depressing the clutch pedal to the unlocking position and speeding up the engine slightly to throw out the pawls 87 before releasing the clutch pedal. The latch 85 can be under the driver's control in a manner similar to that described in connection with the Bowden wire control for the first described form of clutch.

While the operation of the clutch of this invention has been described in detail in connection with the description of the various forms thereof, it will be convenient to summarize the common operation of the several automatic controls at this point. The centrifugal weights and their opposing springs are so proportioned as to come into action at a rotative speed somewhat above idling, the springs thereon normally overbalancing the clutch pressure springs by an amount determining the rotative speed at which the weights withdraw and permit the clutch to engage. Initial clutch engagement is permitted by the initial movements of the weights and engagement is consequently delayed over a slip range sufficient to prevent sudden grabbing with consequent shocks to the engine and transmission. It will be noted that fundamentally the disclosed clutch is a conventional one arranged for manual disengagement since the automatic control releases the clutch engaging mechanism to allow engagement above a predetermined speed, the clutch then becoming a standard clutch, unaffected by the centrifugally responsive mechanism above a predetermined speed. The automatic control can also be disconnected to change the clutch into a normally engaged clutch which is manually disengageable in the usual way.

It will thus be seen that we have invented improved and simplified automatic controls for an otherwise standard clutch which is manually controllable in the usual way and in which the automatic controls can be disconnected at will.

We are aware that many changes may be made and numerous details of construction may be varied through a wide range without departing from the principles of this invention, and we, therefore, do not purpose limiting the patent granted hereon otherwise than necessitated by the prior art.

We claim as our invention:

1. The combination with a conventional clutch structure comprising driving and driven members, spring loaded engaging means for maintaining clutch engagement and manual means for disengaging said clutch, of means cooperating therewith retractable by centrifugal force, said means in its unretracted position being adapted to disengage said clutch and in its retracted position to be withdrawn from the clutch structure to permit normal engagement thereof, and manually controlled means for locking out said cooperating means to disengage the same to prevent the disengagement of the clutch thereby.

2. The combination with a conventional clutch structure comprising driving and driven members, spring loaded engaging means for maintaining clutch engagement, and manual means for disengaging said clutch, of means cooperating therewith retractable by centrifugal force, said means in its unretracted position being adapted to disengage said clutch and in its retracted position to be withdrawn from the clutch structure to permit normal engagement thereof, and a remote control adapted to render said cooperating means inoperative whereby to permit the clutch to engage below the rotative speed required to develop sufficient centrifugal force to retract said means.

3. In combination with a manually disengageable clutch structure including driving and driven members, a separate automatic control operating in parallel with the manual control comprising spring urged means adapted to normally hold the clutch disengaged below a predetermined rotative speed, centrifugally responsive means for retracting said spring urged means to permit the clutch to engage, and manually operable means for disengaging said automatic control from the clutch structure whereby to render the same inoperative to disengage the clutch.

4. In combination with a manually disengageable clutch structure including driving and driven members, a separate automatic control supplementing the manual control comprising spring urged means adapted to normally hold the clutch disengaged below a predetermined rotative speed, centrifugally responsive means for retracting said spring urged means to permit the clutch to engage, and manually operable means for disengaging said automatic control from the clutch structure whereby to render the same inoperative to disengage the clutch.

5. In combination with a manually controllable friction clutch wherein a pressure plate is manually retractable through throwout fingers, a separate control mechanism releasably engaging said throwout fingers and comprising means acting through the throwout fingers to retract said pressure plate below a predetermined rotative speed, and manually controllable means for disengaging said separate control mechanism from said throwout fingers.

6. In combination with a manually controllable friction clutch wherein a pressure plate is manually retractable through throwout fingers, a separate control mechanism releasably engaging said throwout fingers and comprising means rendered inoperative at a predetermined rotative speed and acting to retract said pressure plate below said predetermined rotative speed, and manually controllable means for disengaging said separate control mechanism from said throwout fingers.

7. In combination with a manually controllable friction clutch wherein a pressure plate is manually retractible through throwout fingers, a separate control mechanism releasably engaging said throwout fingers and comprising means acting to retract said pressure plate below a predetermined rotative speed, and manually controllable means for locking out said separate control means to permit normal engagement of the clutch below the rotative speed at which the separate control would otherwise disengage the clutch.

8. In combination with a manually controllable friction clutch wherein a pressure plate is manually retractable through throwout fingers, a separate control mechanism releasably engaging said throwout fingers and comprising means rendered inoperative at a predetermined rotative speed and acting to retract said pressure plate below said predetermined rotative speed, and manually controllable means for locking out said separate control means to permit normal engagement of the clutch below the rotative speed at which the separate control would otherwise disengage the clutch.

9. In an automatic clutch including driving and driven members, yielding means for causing clutching engagement therebetween, and manual means for releasing said clutching engagement, centrifugally energized means associated with the driving member and adapted in its de-energized position to mechanically release said clutching engagement, and means for locking said centrifugally energized means out of operative engagement with the clutch.

10. In combination with a normally engaged clutch structure having provision for manual disengagement at will, of a centrifugally responsive control supplementing the manual control and acting to hold the clutch disengaged below a predetermined rotative speed, and means for mechanically disengaging said centrifugal control from the manual control to permit normal engagement of the clutch when the centrifugal engagement of the clutch would otherwise hold the clutch disengaged.

11. In a clutch including driving and driven members, yielding means for causing clutching engagement therebetween, and manually operable means for releasing said clutching engagement, centrifugally retractable means associated with the manually operable means and adapted in its unretracted position to engage in said manually operable means to release said clutching engagement, and means for rendering said centrifugally retractable means inoperative to engage said manually operable means.

BENJAMIN A. SWENNES.
KAY MILLER.